US006448363B1

(12) United States Patent
Wenning et al.

(10) Patent No.: US 6,448,363 B1
(45) Date of Patent: Sep. 10, 2002

(54) PROCESS FOR PREPARING HIGHLY REACTIVE (SEMI)CRYSTALLINE AND AMORPHOUS BLOCKED POLYISOCYANATES

(75) Inventors: Andreas Wenning, Nottuln; Thomas Weihrauch, Duelmen, both of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/899,240

(22) Filed: Jul. 6, 2001

(30) Foreign Application Priority Data

Jul. 7, 2000 (DE) .......................... 100 33 097

(51) Int. Cl.[7] .................. C08G 18/80; C08G 18/73; C08G 18/75; C08G 18/79; C07C 273/00
(52) U.S. Cl. ............... 528/45; 252/182.2; 252/182.21; 525/124; 525/440; 544/222; 564/32; 528/73
(58) Field of Search .................... 252/182.2, 182.21; 528/45, 73; 544/222; 564/32; 525/124, 440

(56) References Cited

U.S. PATENT DOCUMENTS

| 3,857,818 A | | 12/1974 | Frizelle ................. 525/124 |
| 4,868,298 A | * | 9/1989 | Brinkman ............... 540/525 |
| 4,997,900 A | | 3/1991 | Brinkman ............... 528/45 |
| 5,541,279 A | * | 7/1996 | Gras et al. ............. 528/45 |
| 5,596,064 A | * | 1/1997 | Konig et al. ............ 528/45 |
| 5,646,228 A | * | 7/1997 | Gras et al. ............. 528/45 |
| 5,691,438 A | * | 11/1997 | Konig et al. ............ 528/45 |
| 5,728,795 A | * | 3/1998 | Gras et al. ............. 528/45 |
| 5,804,646 A | | 9/1998 | Witte et al. ............ 524/590 |
| 5,939,547 A | * | 8/1999 | Venham et al. ........... 544/222 |
| 6,051,675 A | * | 4/2000 | Gras .................... 528/45 |
| 6,166,164 A | * | 12/2000 | Gras .................... 528/45 |

FOREIGN PATENT DOCUMENTS

| DE | 2 105 777 | 8/1972 |
| DE | 2 200 342 | 7/1973 |
| DE | 25 42 191 | 4/1976 |
| DE | 27 35 497 | 2/1979 |
| DE | 28 42 641 | 4/1980 |
| DE | 30 04 876 A1 | 8/1981 |
| DE | 30 04 903 A1 | 8/1981 |
| DE | 31 28 743 A1 | 3/1982 |
| DE | 30 30 539 A1 | 4/1982 |
| DE | 30 39 824 A1 | 5/1982 |
| DE | 197 30 669 A1 | 1/1999 |
| EP | 0 159 117 A1 | 10/1985 |
| EP | 0 669 355 | 8/1995 |
| EP | 0 703 256 | 3/1996 |
| EP | 0 816 411 | 1/1998 |
| WO | WO 91/00267 | 1/1991 |

OTHER PUBLICATIONS

Houben–Weyl, Methoden der organischen Chemie, vol. XIV/2, 4th Edition, Georg Thieme Verlag, Stuttgart, 1963, pp. 61–70.

* cited by examiner

*Primary Examiner*—Rabon Sergent
(74) *Attorney, Agent, or Firm*—Oblon, Spivak, McClelland, Maier & Neustadt, P.C.

(57) ABSTRACT

The present invention provides a solventless, continuous process, which includes:

in at least one extruder, intensive compounder, intensive mixer or static mixer, mixing and heating a reaction mixture including the following (A), (B), and one or both of (C) and (D):
  (A) at least one aliphatic, (cyclo)aliphatic and/or cycloaliphatic $C_3$–$C_{50}$ diisocyanate compound;
  (B) at least one aliphatic, (cyclo)aliphatic and/or cycloaliphatic $C_3$–$C_{50}$ polyisocyanate compound containing one or more isocyanurate groups;
  (C) 1,2,4-triazole;
  (D) one or more pyrazole having the formula:

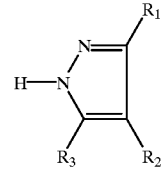

where $R_1$, $R_2$ and $R_3$ simultaneously or independently of one another are hydrogen or alkyl, alkenyl, aralkyl, aryl or N-substituted carbamoyl groups, halogen or —C(=O)—O—$R_4$, where $R_4$ is a $C_1$–$C_{12}$ alkyl group;

to obtain a product mixture including at least one (semi)crystalline, blocked $C_3$–$C_{50}$ isocyanate compound and at least one amorphous, blocked $C_3$–$C_{50}$ isocyanate compound. The present invention also provides a composition prepared by the process and methods of using the composition.

24 Claims, No Drawings

PROCESS FOR PREPARING HIGHLY REACTIVE (SEMI)CRYSTALLINE AND AMORPHOUS BLOCKED POLYISOCYANATES

BACKGROUND OF THE INVENTION

1. Field of the Invention

The invention relates to a process for preparing highly reactive mixtures of (semi)crystalline and amorphous blocked polyisocyanates.

2. Discussion of the Background

Owing to their environmental compatibility, economics and very good coating properties, powder coatings are increasingly displacing conventional solvent-based coating systems. Polyurethane (PU) powder coatings are known for their outstanding coating qualities. The PU powder coatings based on partially or totally blocked polyisocyanates and hydroxyl-containing polymers are heat-curable. These PU powder coatings are widely described in the literature. Examples that may be mentioned include DE-As 21 05 777, 25 42 191, 27 35 497, 28 42 641, 30 04 876, 30 39 824, and 31 28 743. From the large number of blocking agents, described in Houben-Weyl, Methoden der organischen Chemie, Volume XIV/2, 4th Edition, Georg Thieme Verlag, Stuttgart, 1963, pages 61–70, ε-caprolactam has become established for PU powder coatings. However, PU powder coatings based on ε-caprolactam-blocked polyisocyanates require curing temperatures above 170° C. to crosslink the coating.

In order to open up the powder technology to temperature-sensitive workplaces or to reduce energy costs, blocking agents have been sought which are eliminated at lower temperatures than ε-caprolactam. Using oxime-blocked polyisocyanates it is possible to prepare PU powder coatings whose curing temperatures are at a low level. They are described, for example, in DE-A 22 00 342, EP-A 0 432 257, and U.S. 3,857,818. The big disadvantage of these compounds, however, is their thermal instability and pinholing tendency.

Pyrazoles and triazoles are likewise suitable as blocking agents for highly reactive polyisocyanates, but without exhibiting the disadvantages of oximes.

For instance, EP 0 159 117 describes polyisocyanates blocked with pyrazoles. The reaction is conducted batchwise in a solvent. The pyrazole-blocked polyisocyanates may be used as crosslinkers for solvent-based PU powder coatings which may be cured at temperatures around 120° C. The use of these polyisocyanates as powder coating crosslinkers is not described.

U.S. Pat. No. 5,804,646 claims a powder coating containing a hydroxyl-containing polymer and an isocyanate crosslinker. The crosslinker contains a mixture of a (semi) crystalline, aliphatic, (cyclo)aliphatic or cycloaliphatic triazole-blocked isocyanate component and an amorphous aliphatic, (cyclo)aliphatic or cycloaliphatic triazole-blocked isocyanate component.

Such triazole-blocked polyisocyanates are suitable as low-viscosity crosslinkers for outdoor-resistant powder coatings even in automotive finishing, where the quality requirements are extremely exacting. The powder coating composition may be cured at temperatures of 130° C. and above. The crosslinkers of U.S. Pat. No. 5,804,646 are prepared without solvent in a batch process. This process is hampered by great difficulties since the temperature range is very small. On the one hand, high temperatures—generally greater than 120° C.—are required so that the solid obtained during the preparation is present as a melt and can still be discharged from the vessel. On the other hand, the temperature must not rise above 125° C., since otherwise the blocking agent is eliminated.

SUMMARY OF THE INVENTION

Accordingly, one object of the present invention to provide a less complicated, simple, continuous process for preparing the highly reactive pyrazole- and triazole-blocked polyisocyanates which does not have the aforementioned disadvantages of conventional systems.

This and other objects of the invention have been achieved by the present invention, the first embodiment of which provides a solventless, continuous process, which includes:

in at least one extruder, intensive compounder, intensive mixer or static mixer, mixing and heating a reaction mixture including the following (A), (B), and one or both of (C) and (D):
(A) at least one aliphatic, (cyclo)aliphatic and/or cycloaliphatic $C_3$–$C_{50}$ diisocyanate compound;
(B) at least one aliphatic, (cyclo)aliphatic and/or cycloaliphatic $C_3$–$C_{50}$ polyisocyanate compound containing one or more isocyanurate groups;
(C) 1,2,4-triazole;
(D) one or more pyrazole having the formula:

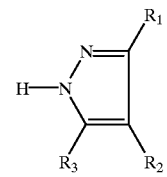

where $R_1$, $R_2$ and $R_3$ simultaneously or independently of one another are hydrogen or alkyl, alkenyl, aralkyl, aryl or N-substituted carbamoyl groups, halogen or —C(=O)—O—$R_4$, where $R_4$ is a $C_1$–$C_{12}$ alkyl group;

to obtain a product mixture including at least one (semi) crystalline, blocked $C_3$–$C_{50}$ isocyanate compound and at least one amorphous, blocked $C_3$–$C_{50}$ isocyanate compound.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Surprisingly it has been found that the reaction of aliphatic, (cyclo)aliphatic or cycloaliphatic polyisocyanates with pyrazoles or triazoles to give a mixture of amorphous and (semi)crystalline crosslinkers for PU powder coatings may be conducted in bulk, i.e., without solvent, and continuously in an extruder, intensive compounder or intensive mixer in accordance with the present invention.

Preferably, the present invention includes a process for the solventless continuous preparation of a mixture of a (semi) crystalline and an amorphous aliphatic, (cyclo)aliphatic or cycloaliphatic, triazole- or pyrazole-blocked $C_3$–$C_{50}$ isocyanate compound by reacting (A) an aliphatic, (cyclo)aliphatic and/or cycloaliphatic $C_3$–$C_{50}$ diisocyanate compound and (B) an aliphatic, (cyclo)aliphatic and/or cycloaliphatic $C_3$–$C_{50}$ polyisocyanate compound containing isocyanurate groups with (C) 1,2,4-triazole and/or (D) pyrazoles of the formula:

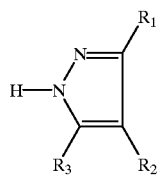

where $R_1$, $R_2$ and $R_3$ simultaneously or independently of one another are hydrogen or alkyl, alkenyl, aralkyl, aryl or N-substituted carbamoyl groups, halogen or —C(=O)—O—$R_4$, where $R_4$ is a $C_1$–$C_{12}$ alkyl group, in an extruder, intensive compounder, intensive mixer or static mixer by intensive commixing and short-term reaction with supply of heat and subsequent isolation of the end product by rapid cooling.

Preferably, the reaction takes place solventlessly and continuously in one or more an extruder, intensive compounder, intensive mixer or static mixer by intensive commixing and short-term reaction with supply of heat. The end product is then successfully obtained by subsequent rapid cooling.

Preferable apparatus for the process of the invention include extruders such as single-screw or multi-screw extruders, especially twin-screw extruders or planetary roll extruders, intensive compounders, intensive mixers such as thorax mixers, or static mixers.

It was surprising that in the abovementioned apparatus the reaction, which in the batchwise process requires several hours, proceeds to completion within a few seconds. Prior to the present invention, it has not been possible to obtain a product which can be simply processed further. In conventional systems, the reaction product crystallizes rapidly in the reactor and thereafter can only be removed from the system with difficulty, mechanically.

By the present invention, it is possible to completely or very substantially convert the reactants with short-term thermal loading in conjunction with the mixing action. By appropriately charging the mixing chambers and/or composition of the screw geometries, the apparatus permits intensive rapid commixing with simultaneous intensive heat exchange. It also ensures uniform flow passage in the lengthwise direction with a highly uniform residence time. A further advantage is that it is possible to set different temperatures in the individual barrels or sections of the apparatus.

The reaction products are preferably supplied to the apparatus in separate product streams; in the case of more than two product streams, these streams may also be supplied in bundled form. Pyrazoles or 1,2,4-triazole and/or mixtures of these blocking agents and/or catalysts and/or additives, such as leveling agents and stabilizers, may be combined into one product stream, as can aliphatic, (cyclo)aliphatic or cycloaliphatic diisocyanates, mixtures of these diisocyanates, and additives and catalysts. The product streams may also be divided and supplied to the apparatus in different proportions at different points. In this way, concentration gradients may be set deliberately, which may bring about the completeness of the reaction. The point of entry of the product streams may be variable in its sequence and may be applied with a time offset.

The cooling which follows the rapid reaction may be integrated into the reaction section, in the form of a multi-barrel embodiment such as in the case of extruders or Conterna machines. It is also possible to use one or more of the following: tube bundles, tube coils, cooling rolls, air conveyors, and metal conveyor belts.

Preferably, the formulation is first brought to an appropriate temperature by further cooling using the corresponding abovementioned equipment, depending on the viscosity of the product leaving the apparatus or the after-reaction zone. This is followed by pelletizing or else by comminution to a desired particle size with one or more of a roll crusher, pin mill, hammer mill, flaking rolls or the like.

Preferably, the mixtures of the (semi)crystalline and amorphous isocyanate compounds are prepared from aliphatic, (cyclo)aliphatic or cycloaliphatic diisocyanates and/or their isocyanurates (trimers). More preferable examples are 1,6-hexamethylene diisocyanate (HDI), 2,2,4-trimethylhexamethylene diisocyanate (TMDI), 2,4,4-trimethylhexamethylene diisocyanate (TMDI), isophorone diisocyanate (IPDI), 1,1-methylenebis-4-isocyanatocyclohexane ($H_{12}$MDI), and 1,3-bis(1-isocyanato-1-methylethyl)benzene (TMXDI) and the corresponding isocyanurates. The ratio of equivalents of the blocked isocyanate groups in the (semi)crystalline component A) and the amorphous component B) is preferably between 8:2 and 2:8, which ranges include all values and subranges therebetween, including non-integer values (for both A and B) such as 7.9, 7.6, 7.3, 6.7, 6.4, 6.1, 5.5, 5.1, 4.6, 4.3, 3.4, 2.9, and 2.7. The mixture is preferably solid at room temperature. Preferably, the melting point of the crosslinker is between 50 and 130° C., which ranges include all values and subranges therebetween, including 55, 65, 70, 75, 85, 95, 105, 115 and 125° C.

Preferably, in the pyrazole compound, the alkyl, alkenyl, aralkyl, aryl groups for the $R_{1-3}$ groups are not particularly limited, and may have any number of carbon atoms as appropriate for the respective groups, considering of course aromaticity and unsaturation, including 1, 2, 3, 4, 5, 6, 7, 8, 9, 10, 11, 12, 13, 14, 15, 16, 17, 18, 19, 20, 21, 22, 23, and 24 carbons or any subrange therebetween.

Preferable blocking agents are 1,2,4-triazole or pyrazoles such as 3,5-dimethylpyrazole, 3-methylpyrazole, 4-nitro-3,5-dimethylpyrazole or 4-bromo-3,5-dimethylpyrazole.

The reaction between the polyisocyanates and the blocking agents may be accelerated by means of catalysts such as tin compounds, for example. One preferable example of a suitable catalyst is dibutyltin dilaurate. The concentration of the catalyst(s) is from 0.01 to 5%, more preferably from 0.05 to 3%, based on the overall formulation. These ranges include all values and subranges therebetween, including 0.02, 0.04, 0.06, 0.1, 0.2, 0.4, 0.5, 0.7, 1, 2, and 4%. In this context, concentration preferably means concentration by weight, based on the total weight of the formulation.

In accordance with the process of the invention, it is preferred to prepare mixtures of 1,2,4-triazole- or 3,5-dimethylpyrazole-blocked 1,6-hexamethylene diisocyanate trimer as amorphous component and 1,2,4-triazole- or 3,5-dimethylpyrazole-blocked 1,6-hexamethylene diisocyanate trimer as crystalline component.

The mixtures prepared in accordance with the invention are particularly suitable as crosslinkers for highly reactive PU powder coating materials.

To prepare PU powder coating materials, the mixtures may be formulated with hydroxyl-containing monomers, oligomers, polymers and/or additives. Mixtures are possible.

The hydroxyl-containing polymers are preferably polymers of average molecular mass, such as epoxy resins, hydroxy acrylates or polyester polyols, for example. Preference is given, however, to hydroxyl-containing polyesters and hydroxylated acrylate resins.

Preferably, the hydroxyl-containing polyesters possess an OH functionality of >2. Preferably, the hydroxyl-containing polyesters possess a number-average molecular weight of 1800–5000, which ranges include all values and subranges therebetween, including 2100, 2200, 2300, 2400, 2800, 3200, 3800, 4200, 4400, 4600 and 4800. Preferably, the hydroxyl-containing polyesters possess an OH number of 20–200 mg KOH/g, which ranges include all values and subranges therebetween, including 30, 50, 70, 90, 110, 130, 150, and 170 mg KOH/g. Preferably, the hydroxyl-containing polyesters possess a viscosity of <60,000 mPa·s, which ranges include all values and subranges therebetween, including less than or equal to 55,000, 45,000, 35,000, 25,000, 20,000, 15,000, and 10,000 mpa·s. Preferably, the hydroxyl-containing polyesters possess a melting point of from 70 to 120° C., which ranges include all values and subranges therebetween, including 75, 85, 95, 105, and 115° C. Especially preferable hydroxyl-containing polyesters of this type, as prepared conventionally by condensing polyols and polycarboxylic acids, are described, for example, in DE-As 27 35 497 and 30 04 903, the entire contents of each of which are hereby incorporated by reference.

Preferably, the hydroxy acrylates have an OH number of 20–150 mg KOH/g, which ranges include all values and subranges therebetween, including 25, 35, 45, 55, 65, 75, 85, 95, 105, 115, and 135 mg KOH/g. Their preparation is described, for example, in DE-As 30 30 539 and 197 30 669, the entire contents of each of which being hereby incorporated by reference.

Preferably, to prepare the ready-to-use powder coating materials, the mixtures, the hydroxyl-containing polymer of average molecular mass, with or without pigments, such as $TiO_2$, for example, and further customary powder coatings additives or auxiliaries, such as leveling agents, for example, e.g., polybutyl acrylate, or degassing agents, e.g., benzoin, or catalysts, e.g., dibutyltin dilaurate (DBTL), are mixed in extruders or compounders at temperatures between 80–140° C. such that the ratio of the OH groups of the hydroxyl-containing polymer to the internal blocked NCO groups of the crosslinker is from 0.6 to 1.2. The above-described temperature range includes all values and subranges therebetween, including 85, 95, 105, 115, 125, and 135° C. The above-described ratio of the OH groups of the hydroxyl-containing polymer to the internal blocked NCO groups of the crosslinker is more preferably 0.8 to 1.1, more particularly preferably 0.9 to 1.0, which ranges together with the above-described ratio includes all values and subranges therebetween, including 0.65, 0.75, 0.85, 0.95, 1.05, and 1.15.

The powder coatings prepared in this way may be applied to the target pieces in accordance with the customary powder application techniques, such as electrostatic powder spraying or fluidized-bed sintering, for example. Preferably, the coatings are cured by heating at temperatures of 130–240° C., which ranges include all values and subranges therebetween, including 135, 145, 155, 165, 185, 205, 225, and 235° C.

A preferred embodiment of the invention is one wherein by appropriate equipping of the mixing chambers and composition of the screw geometry in the extruder or intensive compounder there is, on the one hand, intensive rapid mixing and rapid reaction with simultaneous intensive heat exchange, and on the other hand a uniform flow passage in the lengthwise direction with a very uniform residence time.

The preferred residence time in the apparatus is within the range from less than one minute to a few minutes. More preferably, the residence time is from 2 seconds to 10 minutes, more particularly preferably from 5 seconds to 5 minutes, more especially particularly preferably from 10 seconds to 2 minutes. These ranges include all values and subranges therebetween, including 25, 35, 45, and 55 seconds, and 1, 2, 3, 4, 6, 7, and 9 minutes.

EXAMPLES

Having generally described this invention, a further understanding can be obtained by reference to certain specific examples which are provided herein for purposes of illustration only and are not intended to be limiting unless otherwise specified.

Preparation of the mixtures in accordance with the process of the invention 1.1 General Process Instructions The polyisocyanate or mixture of different polyisocyanates is fed at a temperature of from 20 to 200° C. into the intake zone of a twin-screw extruder. The blocking agent (triazole or pyrazole) or mixture of these blocking agents is metered in at a temperature of from 20 to 200° C. One of the two product streams may if desired contain the catalyst (e.g., dibutyltin dilaurate) in solution. One of the two product streams may be split up if required (inadequate conversion). This stream is then metered in by feeding the major amount (more than 50%) into the intake zone while the smaller stream is fed into one of the following barrels, in order to permit an afterreaction.

The extruder used is composed of different barrels, with usually at least half of them being temperature-controllable.

In an extruder having 4 barrels (B1 to B4), the temperatures are set as follows:

B1: 20–220° C., B2 to B4: 80–220° C. If a stream of reactants is divided, the temperature of the second feed point is chosen to be exactly the same as or similar to that in B1.

All temperatures are setpoint temperatures; temperature adjustment in the extruder barrels is carried out by electrical heating and water or air cooling (pneumatically).

The rotary speed of the twin screw, which is constructed over its entire length from conveying and kneading elements, is from 10 to 380 rpm.

The ratio of the isocyanate groups to the amino groups is from 1:0.5 to 1:1.5, preferably from 1.08 to 1:1.2

The reaction product is either cooled, subsequently comminuted, or shaped and bagged.

1.2 Mixture Preparation Example

Reaction product of HDI, the HDI trimer, and 1,2,4-triazole.

The ratio of NCO groups to NH groups is 1:1. No catalyst is used.

Product stream 1 includes the mixture of 55% by weight TOLONATE HDT (HDI isocyanurate from Rhone-Poulenc) and 14% by weight hexamethylene diisocyanate (based on 100% of the total mixture). Product stream 2 includes 31% by weight 1,2,4-triazole. The product streams are not divided. Product stream 2 is fed as a solid into the first barrel of a twin-screw extruder. Product stream 1 follows two barrels later. The resulting product is applied to a cooling belt.

The residence time in the extruder is within the range from less than one minute to a few minutes.

| Analytical characteristics: | |
|---|---|
| Free NCO (by $^{13}$C-NMR): | <0.5% by weight |
| Total NCO (by wet chemistry): | 19.1% by weight |
| Melting point: | 100–110° C. |

1.3 Comparison With a Compound Prepared in Accordance With a Batchwise Process

| Analytical characteristics: | |
|---|---|
| Free NCO (by $^{13}$C-NMR): | <0.5% by weight |
| Total NCO (by wet chemistry): | 17.9% by weight |
| Melting point: | 105–108° C. |

2. Use Examples

2.1 Hydroxyl-containing Polymer Used

The hydroxyl-containing polymer used was the polyester URALAC P 1580 (hydroxyl number 79 mg KOH/g, DSM) and the polyester CRYLCOAT 690 (hydroxyl number 29 mg KOH/g, UCB).

2.2 Powder Coatings

General Preparation Instructions

The comminuted products, i.e., hydroxyl-containing polyester, triazole-blocked polyisocyanate cross linker, leveling agent, and catalysts if desired, are intimately mixed in an edge runner mill and subsequently homogenized in a twin-screw extruded from Berstorff at a temperature of up to 140° C. maximum. After cooling, the extrudate is fractionated and ground to a particle size <100 μm using a pin mill. The powder thus prepared is applied at 60 kV to degreased and optionally pretreated iron panels using an electrostatic powder spraying unit and the panels are baked at temperatures between 130 and 240° C. in a forced air drying oven.

The abbreviations in the tables below have the following meanings:

| CT = | coat thickness in μm | |
|---|---|---|
| EI = | Erichsen indentation | (DIN 53 156) |
| CH = | cross-hatch adhesion | (DIN 53 151) |
| Impact = | direct impact in inch · lb | (DIN EN-ISO 6272). |

TABLE 1

Transparent powder coating materials

| | Example | | | |
|---|---|---|---|---|
| | 1 | 2 Comparative | 3 | 4 Comparative |
| Formulation | | | | |
| URALAC P 1580 | 74.0 | 74.44 | — | — |
| CRYLCOAT 690 | — | — | 87.19 | 88.08 |
| Compound from 1.2 | 24.9 | — | 11.56 | — |
| Compound from 1.3 | — | 24.31 | — | 10.67 |
| Notes: | 1.0% by weight Resiflow PV 88, 0.25% by weight benzoin | | | |

TABLE 1-continued

Transparent powder coating materials

| | Example | | | |
|---|---|---|---|---|
| | 1 | 2 Comparative | 3 | 4 Comparative |
| Coatings data | | | | |
| CT | 47–54 | 75–84 | 88–92 | 81–93 |
| CH | 0 | 0 | 0 | 0 |
| EI | >10 | >10 | >10 | 8.5 |
| Impact | >160 | 70 | 120 | 100 |
| Curing: | 160° C./30 minutes | | | |

Obviously, numerous modifications and variations of the present invention are possible in light of the above teachings. It is therefore to be understood that within the scope of the appended claims, the invention may be practiced otherwise than as specifically described herein.

This application is based on German patent application 100 33 097.5, filed Jul. 7, 2000, the entire contents of which are hereby incorporated by reference, the same as if set forth at length.

What is claimed is:

1. A solventless, continuous process, comprising:
   in at least one extruder, intensive compounder, intensive mixer or static mixer,
   mixing and heating a reaction mixture comprising the following (A), (B), and one or both of (C) and (D):
   (A) at least one aliphatic and/or cycloaliphatic $C_3$–$C_{50}$ diisocyanate compound;
   (B) at least one aliphatic and/or cycloaliphatic $C_3$–$C_{50}$ polyisocyanate compound containing one or more isocyanurate groups;
   (C) 1,2,4-triazole;
   (D) one or more pyrazole having the formula:

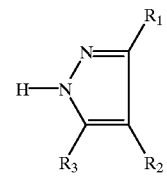

where $R_1$, $R_2$ and $R_3$ simultaneously or independently of one another are hydrogen or alkyl, alkenyl, aralkyl, aryl or N-substituted carbamoyl groups, halogen or —C(=O)—O—$R_4$, where $R_4$ is a $C_1$–$C_{12}$ alkyl group or $R_2$ is nitro;
   to obtain a product mixture comprising at least one (semi)crystalline, blocked $C_3$–$C_{50}$ isocyanate compound and at least one amorphous, blocked $C_3$–$C_{50}$ isocyanate compound.

2. The process as claimed in claim 1, wherein the aliphatic and/or cycloaliphatic $C_3$–$C_{50}$ diisocyanate compound (A) is selected from the group consisting of 1,6-hexamethylene diisocyanate (HDI), 2,2,4-trimethylhexamethylene diisocyanate (TMDI), 2,4,4-trimethylhexamethylene diisocyanate (TMDI), isophorone diisocyanate (IPDI), 1,1-methylenebis-4-isocyanatocyclohexane ($H_{12}$MDI), 1,3-bis(1-isocyanato-1-methylethyl)benzene (TMXDI), and combinations thereof.

3. The process as claimed in claim 1, wherein in said product mixture a ratio of equivalents between the (semi)

crystalline, blocked $C_3$–$C_{50}$ isocyanate compound and the amorphous, blocked $C_3$–$C_{50}$ isocyanate compound, based on the blocked isocyanate groups, is between 8:2 and 2:8.

4. The process as claimed in claim 1, wherein said pyrazole (D) is selected from the group consisting of 3,5-dimethylpyrazole, 3-methylpyrazole, 4-nitro-3,5-dimethylpyrazole, 4-bromo-3,5-dimethylpyrazole, and combinations thereof.

5. The process as claimed in claim 1, wherein the extruder is selected from the group consisting of a single-screw extruder, twin-screw extruder, multi screw extruder, planetary roll extruder, and combinations thereof.

6. The process as claimed in claim 1, wherein the extruder is a twin-screw extruder.

7. The process as claimed in claim 1, wherein the mixing and heating is carried out in the intensive mixer.

8. The process as claimed in claim 1, wherein the mixing and heating is carried out in the static mixer.

9. The process as claimed in claim 1, wherein the extruder, intensive compounder, intensive mixer or static mixer comprises two or more zones, which are identical or different, and which, optionally, are thermally controlled independently of one another.

10. The process as claimed in claim 1, wherein a temperature in the extruder, intensive compounder, intensive mixer or static mixer is 10 to 250° C.

11. The process as claimed in claim 1, wherein a temperature in the extruder, intensive compounder, intensive mixer or static mixer is 10 to 190° C.

12. The process as claimed in claim 1, wherein the extruder or intensive compounder is equipped to allow mixing and reaction with a simultaneous heat exchange, and a uniform flow passage in a lengthwise direction with a uniform residence time.

13. The process as claimed in claim 1, wherein the reaction mixture further comprises at least one member selected from the group consisting of a catalyst, an additive, and a combination thereof.

14. The process as claimed in claim 1, wherein at least one member selected from the group consisting of a catalyst, an additive, and a combination thereof are supplied together or separately in one or more streams to the extruder, intensive compounder, intensive mixer or static mixer.

15. The process as claimed in claim 1, wherein the additive is additionally supplied to the extruder, intensive compounder, intensive mixer or static mixer.

16. The process as claimed in claim 1, wherein at least one member selected from the group consisting of a catalyst, an additive, and a combination thereof are supplied in two or more streams to the extruder, intensive compounder, intensive mixer or static mixer.

17. The process as claimed in claim 1, wherein at least one member selected from the group consisting of a catalyst, an additive, and a combination thereof are supplied together or separately in one or more streams to the extruder, intensive compounder, intensive mixer or static mixer.

18. The process as claimed in claim 1, wherein the reaction mixture further comprises a catalyst.

19. The process as claimed in claim 18, wherein at least one additive is supplied together or separately in one or more streams to the extruder, intensive compounder, intensive mixer or static mixer.

20. The process as claimed in claim 1, further comprising an after-reaction zone.

21. The process as claimed in claim 1, further comprising at least one process step selected from the group consisting of cooling said product mixture, comminuting said product mixture, shaping said product mixture, bagging said product mixture, and a combination thereof.

22. The process as claimed in claim 1, further comprising admixing said reaction product with at least one hydroxyl group-containing oligomer or polymer.

23. The process as claimed in claim 22, further comprising applying the resulting product mixture to a surface and heating to form a coating.

24. The process as claimed in claim 1, further comprising reacting said reaction product with at least one hydroxyl group-containing oligomer or polymer.

* * * * *